United States Patent
Stemler

(10) Patent No.: US 6,300,735 B1
(45) Date of Patent: Oct. 9, 2001

(54) CONTROL FOR A TWO DEGREE OF FREEDOM ELECTROMECHANICAL TRANSMISSION AND ASSOCIATED METHOD

(75) Inventor: Eric D. Stemler, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/532,852

(22) Filed: Mar. 22, 2000

(51) Int. Cl.$^7$ ................................ H02P 7/00; B60K 1/02
(52) U.S. Cl. ..................... 318/433; 318/34; 318/139; 477/3; 180/65.2; 180/65.6
(58) Field of Search ...................... 477/3, 15, 16, 477/20, 110, 111; 180/65.2, 65.6, 65.8; 318/139, 432, 433, 34

(56) References Cited

U.S. PATENT DOCUMENTS

| | | |
|---|---|---|
| 4,233,858 | 11/1980 | Rowlett . |
| 4,354,144 | 10/1982 | McCarthy . |
| 4,630,508 | 12/1986 | Klatt . |
| 5,558,595 | 9/1996 | Schmidt et al. . |
| 5,571,058 | 11/1996 | Schmidt . |
| 5,801,497 | 9/1998 | Shamoto et al. . |
| 5,931,757 | 8/1999 | Schmidt . |
| 5,991,683 * | 11/1999 | Takaoka et al. ............... 180/65.2 X |
| 6,090,007 * | 7/2000 | Nakajima et al. .................. 477/3 X |
| 6,135,914 * | 10/2000 | Yamaguchi et al. .................. 477/3 |
| 6,166,502 * | 12/2000 | Pattok et al. .................. 318/432 X |
| 6,203,468 * | 3/2001 | Nitta et al. ..................... 477/20 X |
| 6,211,636 * | 4/2001 | Matsubara et al. ............... 318/432 X |
| 6,232,733 * | 5/2001 | Obayashi et al. .................. 318/432 |

* cited by examiner

*Primary Examiner*—Rodney H. Bonck
*Assistant Examiner*—Ha Ho
(74) *Attorney, Agent, or Firm*—Kevin M. Kercher

(57) ABSTRACT

The transmission includes a planetary gearing mechanism including an input member adapted for connection to an engine, a member connected to a first electric machine operable as a motor or a generator, a member connected to a second electric machine operable as a motor or a generator, and an output member, the first and second electric machines and the members connected thereto being respectively rotatable for controlling a torque acting on the output member. The present control and associated method includes a first controller for controlling the rotation of the first electric machine and a second controller for controlling the rotation of the second electric machine, the first and second controllers being connected in electrical communication by a conductive link and controllable by first and second torque command signals, respectively. The present control includes sensors for sensing rotational speeds of the first and second electric machines, respectively, and a transmission controller operable for generating and outputting the first and second torque command signals to the controllers corresponding to a desired torque value for the output member, by determining first and second torque values for the first and second command signals, respectively, without exceeding predetermined torque limits for the electric machines and while maintaining an electrical parameter of the conductive link within a desired range.

8 Claims, 3 Drawing Sheets

CONTROL FOR A TWO DEGREE OF FREEDOM ELECTROMECHANICAL TRANSMISSION AND ASSOCIATED METHOD

TECHNICAL FIELD

This invention relates generally to an electromechanical transmission, and more particularly, to a control for a two degree of freedom, multiple member electromechanical transmission wherein output torque commands received are implemented within power and torque limits for electric machines used for controlling the transmission output.

BACKGROUND ART

An electromechanical transmission typically includes a planetary gearing arrangement having, for example, three planetaries, and multiple members connected respectively to an engine, multiple electric machines, and an output. The electric machines are each typically operable in a generator mode or a motor mode and are electrically linked. Sometimes the electrical circuitry additionally includes a power source and/or a storage device such as one or more batteries. By the term two degree of freedom transmission, it is generally meant that two unique parameters are needed to positively control the transmission output.

When controlling a two degree of freedom electromechanical transmission, a problem to be overcome is how to maximize the dynamic response of the transmission to input commands such as an operator input, changing load conditions and/or changing environmental conditions such as grade and the like, while also maximizing electrical efficiency, without exceeding torque and power limits for the electrical machines which change with speed. Particularly in this regard, it is desired to maintain a stable voltage over the electrical link between the electrical machines as much as possible over the range of operation of the transmission.

Accordingly, the present invention is directed to overcoming one or more of the problems as set forth above.

DISCLOSURE OF THE INVENTION

In one aspect of the present invention a control for an electromechanical transmission including a planetary gearing mechanism including an input member adapted for connection to an engine, a member connected to a first electric machine operable as a motor or a generator, a member connected to a second electric machine operable as a motor or a generator, and an output member, the first and second electric machines and the members connected thereto being respectively rotatable for controlling a torque acting on the output member is disclosed. The control includes a first controller for controlling the rotation of the first electric machine and a second controller for controlling the rotation of the second electric machine, the first and second controllers being connected in electrical communication by a conductive link and controllable by first and second torque command signals, respectively, sensors for sensing rotational speeds of the first and second electric machines, respectively, and a transmission controller operable for generating and outputting the first and second torque command signals to the controllers corresponding to a desired torque value for the output member, by determining first and second torque values for the first and second command signals, respectively, without exceeding predetermined torque limits for the electric machines and while maintaining an electrical parameter of the conductive link within a desired range.

In another aspect of this invention, a method for a method for controlling a torque acting on an output member of a transmission having an input member connected to an engine, a member connected to a first electric machine operable as a motor or a generator, and a member connected to a second electric machine operable as a motor or a generator, the first and second electrical machines being controlled by controllers connected in electrical communication by a conductive link is disclosed. The method includes the steps of providing a desired torque value for the output and a corresponding electrical parameter value for the conductive link, calculating an initial torque command value $T_{EC1}$ for controlling the first electric machine and an initial torque value $T_{EC2}$ for controlling the second electric machine, based on a speed $N_1$ for the first electrical machine, a speed $N_2$ for the second electrical machine and a value for the electrical parameter, and comparing the initial torque values $T_{EC1}$ and $T_{EC2}$ to predetermined limit values $L_1$ and $L_2$, respectively, and if the initial torque values $T_{EC1}$ or $T_{EC2}$ are less than or equal to the limit values $L_1$ and $L_2$, respectively, then outputting the initial torque values $T_{EC1}$ and $T_{EC2}$ to the controllers.

BEST MODE FOR CARRYING OUT THE INVENTION

Figure 1:
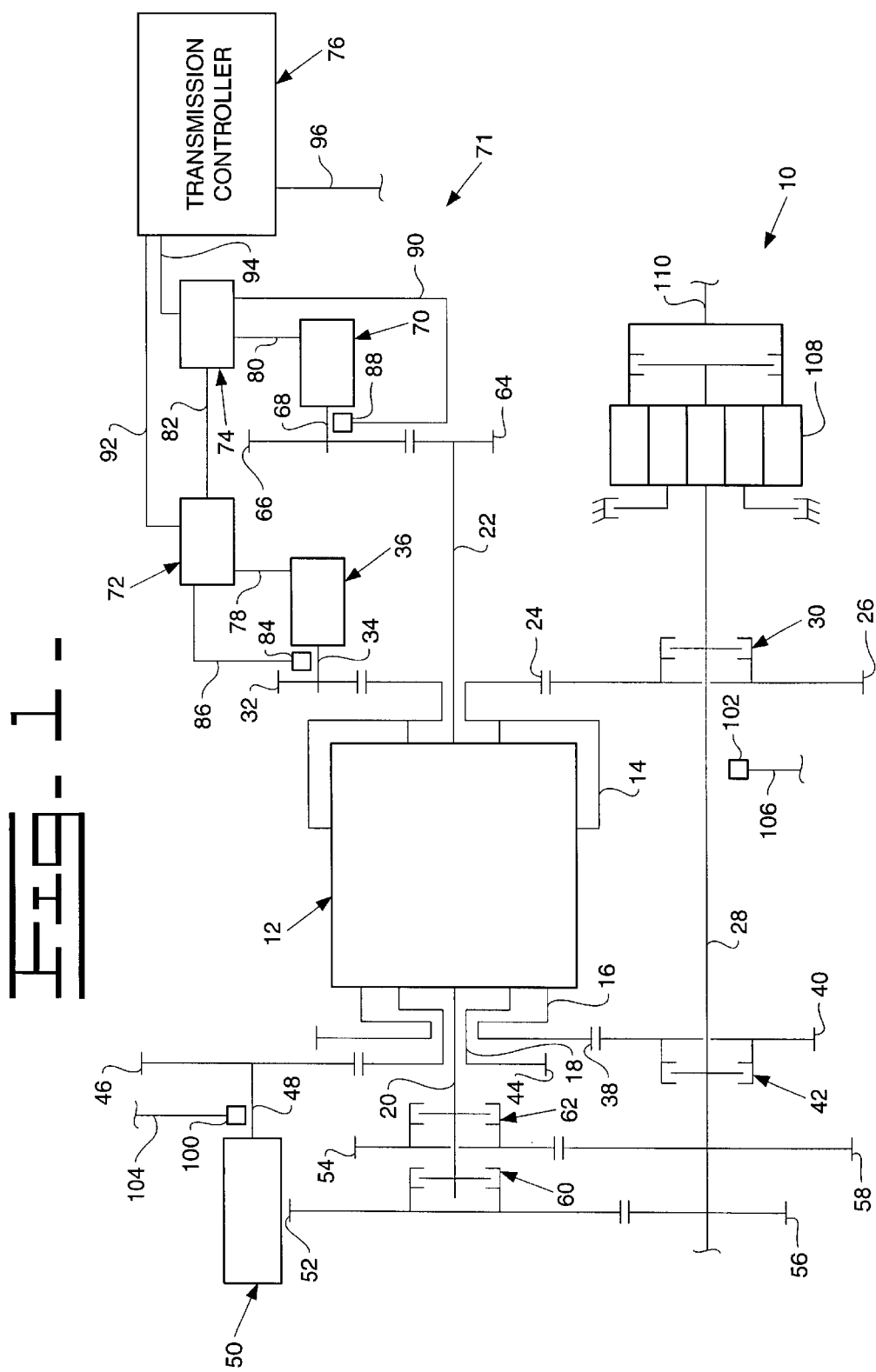
FIG. 1 is a simplified schematic view of an electromechanical transmission including a control according to the present invention.

Referring to FIG. 1, a multiple range continuously variable electromechanical transmission 10 is shown. Transmission 10 is used to propel a machine, not shown. Transmission 10 includes a planetary gearing mechanism 12, a first member 14, a second member 16, a third member 18, a fourth member 20, and a fifth member 22. Planetary gearing mechanism includes three planetary gear sets (not shown), each including elements such as a sun gear, a carrier with planet gears, and a ring gear. Here, it should be understood that transmission 10 can be configured differently so as to include fewer or greater numbers of gearing arrangements and components thereof without departing from the scope of the present invention. It should also be recognized and understood that alternatively members 14, 16, 18, 20 and 22 can be connected to and associated with various specific elements of transmission 10 and planetary gearing mechanism 12 without departing from the present invention.

First member 14 includes a gear 24 enmeshed with a gear 26 selectably connectable to an intermediate output shaft 28 by a clutch 30. Gear 24 is also enmeshed with a gear 32 on a shaft 34 of a first electric machine 36. Second member 16 includes a gear 38 enmeshed with a gear 40 selectably connectable to intermediate output shaft 28 by a clutch 42. Third member 18 includes a gear 44 enmeshed with a gear 46 on a shaft 48 of an internal combustion engine 50. Fourth member 20 is alternately selectably engageable with gears 52 and 54 enmeshed with gears 56 and 58, respectively, on intermediate output shaft 28, by clutches 60 and 62, respectively. Fifth member 22 includes a gear 64 enmeshed with a gear 66 on a shaft 68 of a second electric machine 70.

First and second electric machines 36, 70 are each operable in a generator mode rotatably driven by the respective member 14, 22 connected thereto for producing electrical energy, and in a motor mode drivably rotating the respective member 14, 22 connected thereto, under control of a control 71 constructed and operable according to the present invention. Control 71 includes a first electric machine controller 72, a second electric machine controller 74, and a transmission controller 76 operable for sending commands to the controllers 72, 74. Electric machine controllers 72, 74 are connected to respective electric machines 36, 70, respectively, by conductive paths 78, 80, and to one another by a conductive link 82. Control 71 includes a speed sensor 84 connected to electric machine controller 72 by a conductive path 86 and positioned for sensing a rotational speed of shaft 34 of first electric machine 36. Control 71 includes a second speed sensor 88 connected to electric machine controller 74 by a conductive path 90 and positioned for sensing a rotational speed of shaft 68 of second electric machine 70. Electric machine controllers 72, 74 are connected in electrical communication with transmission controller 76 by conductive paths 92 and 94, respectively. Transmission controller 76 is connected by a conductive path 96 to a high level transmission controller 98 (FIG. 2) for receiving an input signal. Speed sensors 100 and 102 are connected by conductive paths 104 and 106, respectively, to high level transmission controller 98 (FIG. 2) and are positioned for sensing rotational speeds for shaft 48 of motor 50 and intermediate output shaft 28, respectively, and are operable for outputting signals representative of the sensed speeds to transmission controller 98. Here, intermediate output shaft 28 additionally includes a directional control mechanism 108 connected to an output shaft 110, it being contemplated that speed sensor 102 being positionable for sensing the speed of intermediate output shaft 28 or output shaft 110 without departing from the present invention.

Figure 2:
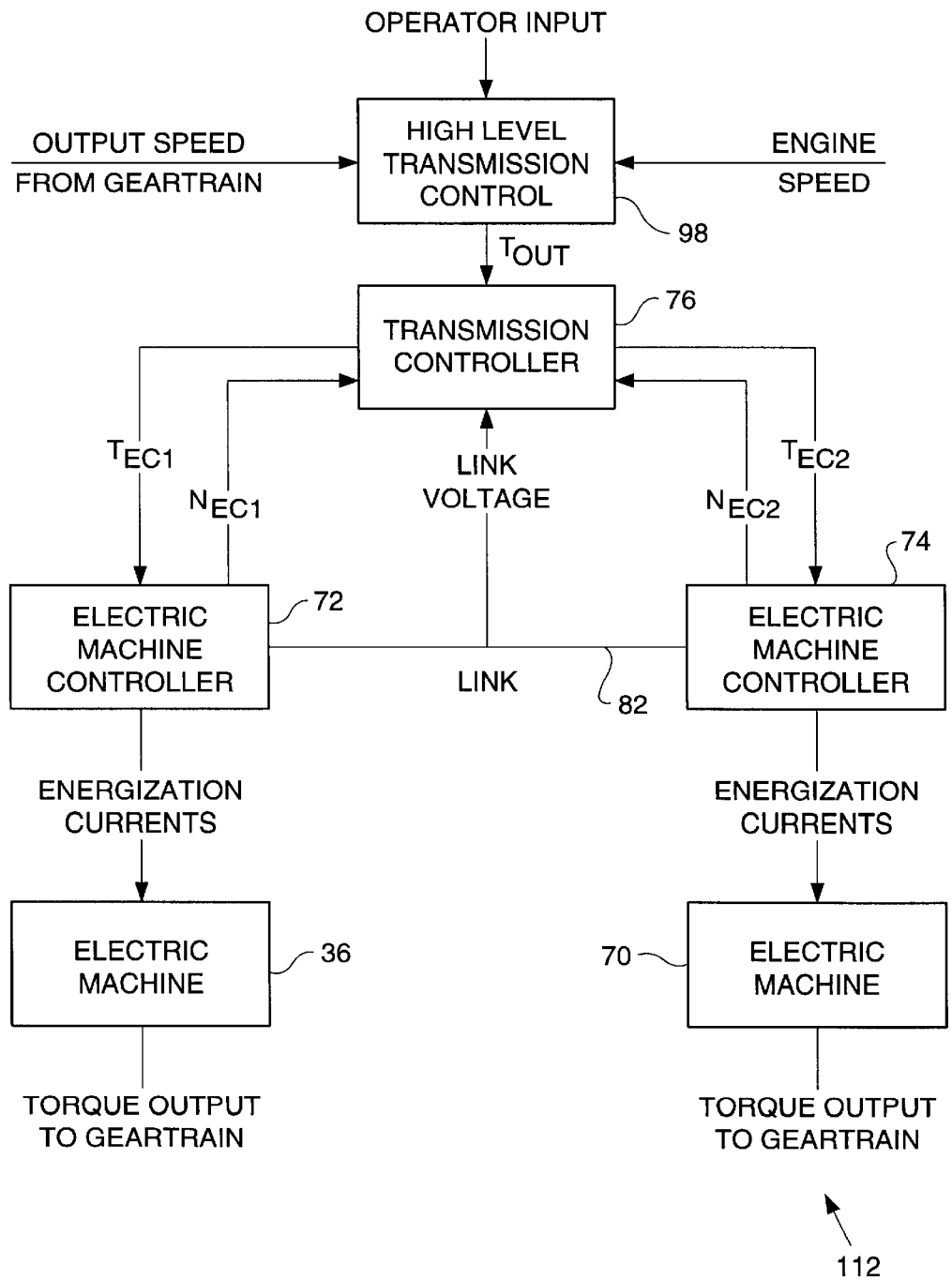
FIG. 2 is a simplified block diagram illustrating the present invention.

Referring also to FIG. 2, a high level block diagram 112 of aspects of transmission 10 and control 71 is shown for illustrating operation thereof. In operation, high level transmission control 98 receives inputs that can include, but are not limited to, an operator input, an output speed input from speed sensor 102, and an engine speed input from sensor 100. Based on the inputs, high level transmission control 98 determines a desired output torque value $T_{out}$ and outputs torque $T_{out}$ to transmission controller 76. Transmission controller 76 includes a processor and is operable to output torque commands $T_{EC1}$ and $T_{EC2}$ to electric machine controllers 72 and 74, respectively, for operating electric machines 36 and 70 in the generator mode or the motor mode as required to produce the desired output torque $T_{out}$. Transmission 10 is a two degree of freedom transmission, thus requiring two unique parameters to positively control the output torque thereof. Here, the two parameters chosen are the commanded transmission torque $T_{out}$ and voltage over conductive link 82 between electric machine controllers 72 and 74. Transmission controller 76 is operable to determine values for torque commands to be outputted to electric machine controllers 72 and 74 using the following control equations.

$$aT_{EC1} + bT_{EC2} = cT_{out} \quad \text{Equation 1:}$$

$$N_{EC1}T_{EC1} + N_{EC2}T_{EC2} = -P_{DC} \quad \text{Equation 2:}$$

where $T_{EC1}$ is first electric machine 36 commanded torque;
$T_{EC2}$ is second electric machine 70 commanded torque;
$T_{out}$ is commanded transmission output torque;
$N_{EC1}$ is measured speed of first electric machine 36;
$N_{EC2}$ is measured speed of second electric machine 70;
$P_{DC}$ is link power from a link voltage compensator; and
a, b, c are constants determined based on parameters of transmission 10, here, ratios between the members connected to the electric machines 36, 72 and intermediate output shaft 28 or output shaft 110.

Speeds $N_{EC1}$ and $N_{EC2}$ are sensed by speed sensors 84 and 88. The link power quantity is determined from a compensator, for example, a proportional-integral-derivative technique based on a link voltage error. For instance, if a nominal link voltage of 550 volts is selected, and an actual measured voltage is less or greater than the nominal voltage, the difference will be the link voltage error. Electric machines 36 and 70 have torque and power limits that vary with speed, and if exceeded, can result in damage to the machines. The torque limits for electric machines 36 and 70 are predetermined values that can be expressed as $L_1$ and $L_2$, respectively. For stability and electrical efficiency, it is desirable to maintain the voltage over conductive link 82 at or within a predetermined range of the nominal value therefor. Thus, one of the torque command values $T_{EC1}$ or $T_{EC2}$ can be set to its limit $L_1$ or $L_2$, respectively, and with commanded transmission output torque $T_{out}$, measured speeds $N_{EC1}$ and $N_{EC2}$, link power $P_{DC}$ and constants a,b,c known, Equations 1 and 2 can be solved for the remaining torque command value $T_{EC1}$ or $T_{EC2}$. With the selected torque command value set to its limit and the other torque command value calculated using Equations 1 and 2 above, electric machine controllers 72 and 74 can be controlled to output the required energization currents to electric machines 36 and 70 for operating the electric machines for producing the desired output torque $T_{out}$, as shown.

Figure 3:
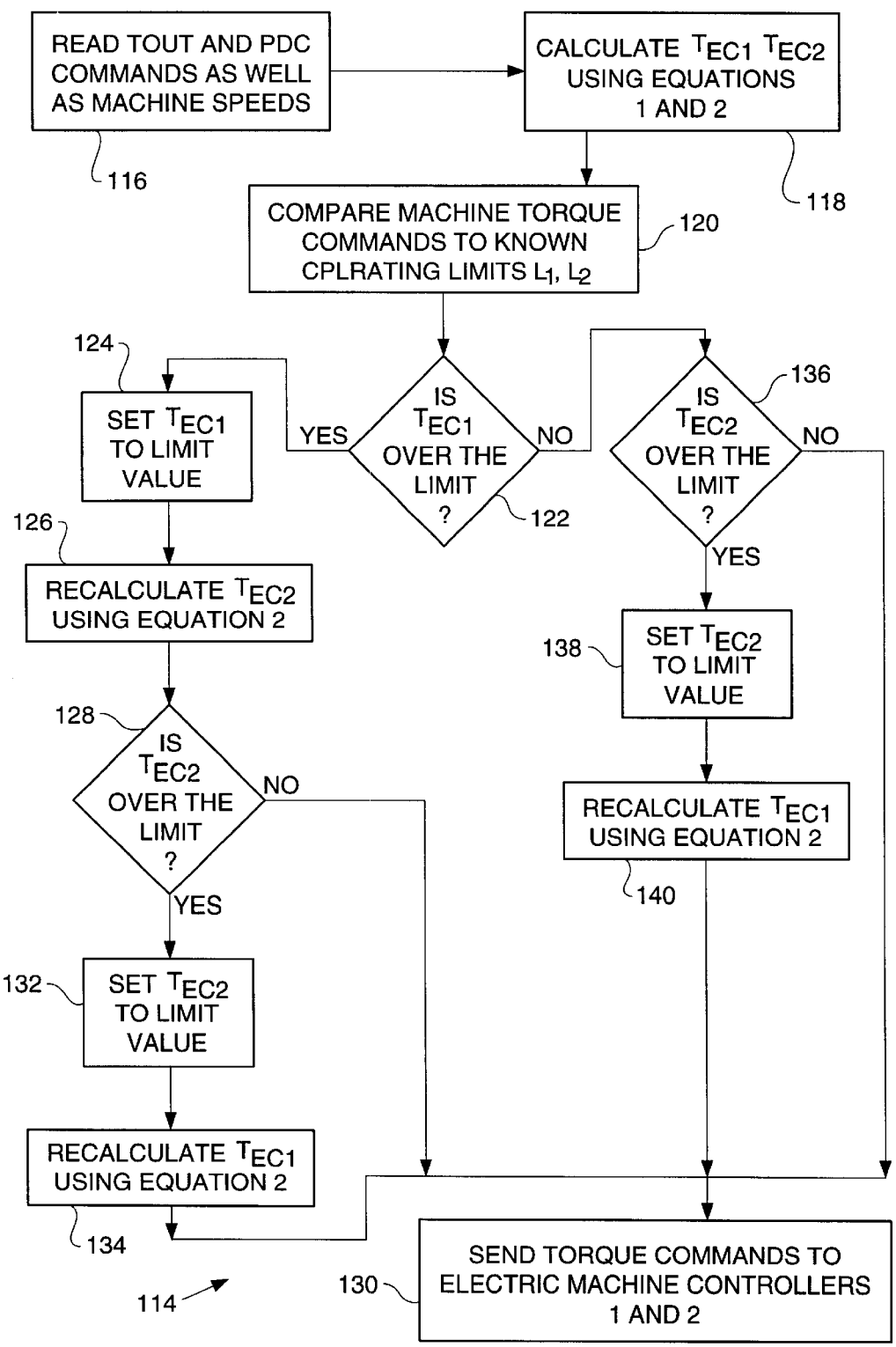
FIG. 3 is a high level flow chart illustrating the method of the present invention.

Referring also to FIG. 3, a high level flow diagram 114 showing the steps of the method of operation of control 71 are summarized. At block 116 transmission controller 76 reads the output torque $T_{out}$ and link power $P_{DC}$ commands as well as the sensed speeds $N_{EC1}$ and $N_{EC2}$. At block 118, initial torque command values $T_{EC1}$ and $T_{EC2}$ are calculated using Equations 1 and 2. Here, as noted, it is desired to maintain operation of electric machines 36 and 70 within the known operating torque limits $L_1$ and $L_2$ therefor, as shown at block 120. This is done as follows. First, as shown at decision block 122, initial torque value $T_{EC1}$ is compared to the limit $L_1$. If torque value $T_{EC1}$ exceeds limit $L_1$, torque value $T_{EC1}$ is set to limit value $L_1$, as shown at block 124. Then, torque value $T_{EC2}$ is recalculated using Equation 2, as shown at block 126. At decision block 128, recalculated torque value $T_{EC2}$ is compared to limit $L_2$. If recalculated torque value $T_{EC2}$ is less than or equal to $L_2$, $T_{EC1}$ set to $L_2$ and the recalculated torque value $T_{EC2}$ are outputted as torque commands to electric machine controllers 72 and 74, as shown at block 130. If recalculated torque value $T_{EC2}$ exceeds limit $L_2$, then torque value $T_{EC2}$ is set to limit value $L_2$, as shown at block 132. Torque value $T_{EC1}$ is then recalculated using Equation 2, as shown at block 134 and the recalculated torque value $T_{EC1}$ and torque value $T_{EC2}$ set to limit value $L_2$ are outputted to controllers 72 and 74 as the torque commands.

Returning to decision block 122, if initial torque value $T_{EC1}$ is less than or equal to limit $L_1$, initial torque value $T_{EC2}$ is compared to the limit $L_2$, as shown at decision block 136. If initial torque value $T_{EC2}$ is less than or equal to limit $L_2$, then initial torque values $T_{EC1}$ and $T_{EC2}$ are outputted to controllers 72 and 74 as the torque commands. If initial torque value $T_{EC2}$ exceeds limit $L_2$, then torque value $T_{EC2}$ is set to limit value $L_2$, as shown at block 138. Then, torque value $T_{EC1}$ is recalculated using Equation 2, as shown at block 140 and then the recalculated torque value $T_{EC1}$ and torque value $T_{EC2}$ set to limit value $L_2$ are outputted to controllers 72 and 74 as the torque commands.

Industrial Applicability

The present electromechanical transmission 10 and control method disclosed and discussed herein has utility for use with a wide variety of machines wherein smooth, efficient dynamic operation is desired, including, but not limited to, a wheel loader or a track type tractor and the like.

Other aspects, objects and advantages of the present invention can be obtained from a study of the drawings, the disclosure and the appended claims.

What is claimed is:

1. A control for an electromechanical transmission including a planetary gearing mechanism including an input member adapted for connection to an engine, a member connected to a first electric machine operable as a motor or a generator, a member connected to a second electric machine operable as a motor or a generator, and an output member, the first and second electric machines and the members connected thereto being respectively rotatable for controlling a torque acting on the output member, the control comprising:

a first controller for controlling the rotation of the first electric machine and a second controller for controlling the rotation of the second electric machine, the first and second controllers being connected in electrical communication by a conductive link and controllable by first and second torque command signals, respectively;

sensors for sensing rotational speeds of the first and second electric machines, respectively; and a transmission controller operable for generating and outputting the first and second torque command signals to the first and second controllers corresponding to a desired torque value for the output member, by determining first and second torque values for the first and second torque command signals, respectively, without exceeding predetermined torque limits for the electric machines and while maintaining an electrical parameter of the conductive link within a desired range.

2. The control of claim 1, wherein the electrical parameter is a voltage and the transmission controller determines the first and second torque values by calculating initial first and second torque values based upon the desired torque value for the output member, sensed speeds of the members connected to the electric machines and the voltage, then comparing the initial first and second torque values to the predetermined torque limits for the electric machines and if one of the torque values is greater than the limits therefor then setting said one of the torque values equal to a predetermined value and recalculating the other of the torque values and outputting said predetermined value and the recalculated torque value as the torque commands.

3. The control of claim 2, wherein the transmission controller is operable to first compare the initial first torque value to the predetermined torque limit for the first electric machine and if the initial first torque value is greater than said limit the transmission controller sets the first torque value equal to said limit and recalculates the second torque value and compares the recalculated second torque value to the predetermined torque limit for the second electric machine and if the recalculated second torque value is less than said limit for the second electric machine the transmission controller outputs the first and second torque values as the torque commands, and if the recalculated second torque value is greater than said limit for the second electric machine the transmission controller sets the second torque value equal to said limit and recalculates the first torque value and outputs the recalculated first torque value and the second torque value set to said limit as the torque commands.

4. The control of claim 2, wherein the transmission controller is operable to first compare the initial first torque value to the predetermined torque limit for the first electric machine and if the initial first torque value is less than or equal to said limit the transmission controller compares the initial second torque value to the predetermined torque limit for the second electric machine and if the initial second torque value is less than said limit for the second electric machine the transmission controller outputs the first and second torque values as the torque commands, and if the initial second torque value is greater than said limit for the second electric machine the transmission controller sets the second torque value equal to said limit and recalculates the first torque value and outputs the recalculated first torque value and the second torque value set to said limit as the torque commands.

5. A method for controlling a torque acting on an output member of a transmission having an input member connected to an engine, a member connected to a first electric machine operable as a motor or a generator, and a member connected to a second electric machine operable as a motor or a generator, the first and second electrical machines being controlled by controllers connected in electrical communication by a conductive link, the method comprising the steps of:

providing a desired torque value for the output member and a corresponding electrical parameter value for the conductive link;

calculating an initial torque command value $T_{EC1}$ for controlling the first electric machine and an initial torque value $T_{EC2}$ for controlling the second electric machine, based on a speed $N_1$ for the first electrical machine, a speed $N_2$ for the second electrical machine and a value for the electrical parameter; and comparing the initial torque values $T_{EC1}$ and $T_{EC2}$ to predetermined limit values $L_1$ and $L_2$, respectively, and if the initial torque values $T_{EC1}$ or $T_{EC2}$ are less than or equal to the limit values $L_1$ and $L_2$, respectively, then outputting the initial torque values $T_{EC1}$ and $T_{EC2}$ to the controllers.

6. The method of claim 5, wherein the step of comparing the initial torque values $T_{EC1}$ and $T_{EC2}$ to predetermined limit values $L_1$ and $L_2$ includes the step of:

(i) if the initial torque value $T_{EC1}$ is less than or equal to the limit value $L_1$ then comparing the initial torque value $T_{EC2}$ to the limit value $L_2$ and if the initial torque value $T_{EC2}$ is less than or equal to the limit value $L_2$ then outputting the initial torque values $T_{EC1}$ and $T_{EC2}$ to the controllers, and if the initial torque value $T_{EC2}$ is greater than the limit value $L_2$ then setting the torque value $T_{EC2}$ to the limit value $L_2$ and recalculating the torque value $T_{EC1}$ with the torque value $T_{EC2}$ set to limit value $L_2$ and then outputting the recalculated torque value $T_{EC1}$ and the torque value $T_{EC2}$ set to limit value $L_2$ to the controllers.

7. The method of claim 5, wherein the step of comparing the initial torque values $T_{EC1}$ and $T_{EC2}$ to predetermined limit values $L_1$ and $L_2$ includes the step of:

(ii) if the initial torque value $T_{EC1}$ is greater than the limit value $L_1$ then setting the torque value $T_{EC1}$ to the limit value $L_1$ and recalculating the torque value $T_{EC2}$ with the torque value $T_{EC1}$ set to the limit value $L_1$ and if the torque value $T_{EC2}$ is less than or equal to the limit value $L_2$ then outputting the torque value $T_{EC1}$ set to the limit value $L_1$ and the recalculated torque value $T_{EC2}$ to the controllers, and if the torque value $T_{EC2}$ is greater than the limit value $L_2$ then setting the torque value $T_{EC2}$ to the limit value $L_2$, recalculating the torque value $T_{EC1}$ with the torque value $T_{EC2}$ set to the limit value $L_2$ and outputting the recalculated torque value $T_{EC1}$ and the torque value $T_{EC2}$ set to the limit value $L_2$ to the controllers.

8. The method of claim 5, wherein the parameter is a voltage.

* * * * *